United States Patent
Porten et al.

(10) Patent No.: US 8,272,361 B2
(45) Date of Patent: Sep. 25, 2012

(54) METHOD FOR CYLINDER SYNCHRONIZATION OF AN INTERNAL COMBUSTION ENGINE

(75) Inventors: Guido Porten, Vaihingen/Enz (DE); Jens Wolber, Gerlingen (DE); Markus Amler, Leonberg-Gebersheim (DE); Matthias Walz, Wiernsheim (DE); Jan-Mathias Meng, Ludwigsburg (DE); Joerg Koenig, Stuttgart (DE); Marc Schott, Moeglingen (DE); Pierre-Yves Crepin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 210 days.

(21) Appl. No.: 12/444,431

(22) PCT Filed: May 5, 2008

(86) PCT No.: PCT/EP2008/055504
§ 371 (c)(1),
(2), (4) Date: Apr. 6, 2009

(87) PCT Pub. No.: WO2008/135560
PCT Pub. Date: Nov. 13, 2008

(65) Prior Publication Data
US 2010/0031919 A1    Feb. 11, 2010

(30) Foreign Application Priority Data

May 4, 2007  (DE) .......................... 10 2007 020 964

(51) Int. Cl.
*F02B 3/00* (2006.01)

(52) U.S. Cl. .......................... 123/294; 123/299; 123/305

(58) Field of Classification Search .................. 123/294, 123/299, 305, 673, 691, 692, 696, 443
See application file for complete search history.

(56) References Cited

U.S. PATENT DOCUMENTS

| | | | |
|---|---|---|---|
| 4,197,767 A * | 4/1980 | Leung ............................. | 477/98 |
| 4,214,563 A * | 7/1980 | Hosaka .......................... | 123/687 |
| 5,975,046 A * | 11/1999 | Kaneko et al. ................ | 123/300 |
| 6,378,297 B1 * | 4/2002 | Ito et al. ......................... | 60/284 |
| 6,848,301 B2 | 2/2005 | Kondo | |
| 2003/0106305 A1 * | 6/2003 | Ogiso et al. .................... | 60/285 |

FOREIGN PATENT DOCUMENTS

| | | |
|---|---|---|
| DE | 38 00 176 | 7/1989 |
| DE | 198 28 279 | 12/1999 |
| DE | 199 03 721 | 7/2000 |
| DE | 199 09 474 | 9/2000 |
| DE | 10 2005 001 887 | 7/2006 |
| JP | 2004-190593 | 7/2004 |
| JP | 2006-83746 | 3/2006 |
| WO | WO 01/90557 | 11/2001 |
| WO | WO 2005/075806 | 8/2005 |

* cited by examiner

*Primary Examiner* — John Kwon
(74) *Attorney, Agent, or Firm* — Merchant & Gould P.C.

(57) ABSTRACT

The aim of the invention is to optimize the running smoothness of an internal combustion engine. To achieve this aim, the individual cylinders are synchronized with respect to their torque contribution. According to the method, fuel is injected into the combustion chamber of a cylinder in at least one injection step, the at least one injection contributing to the torque of the internal combustion engine. Fuel is injected into the combustion chamber of the cylinder in a torque neutral manner by way of a secondary injection during a working stroke of the cylinder and the amount of fuel of the secondary injection us calculated in such a manner that the exhaust gas substantially corresponds to a stoichiometric air/fuel mixture.

15 Claims, 4 Drawing Sheets

METHOD FOR CYLINDER SYNCHRONIZATION OF AN INTERNAL COMBUSTION ENGINE

TECHNICAL FIELD

The invention is based on a method for cylinder synchronization according to the category of independent claims.

BACKGROUND

The cylinder synchronization was so far used in systems with gasoline direct injection. The cylinders are thereby synchronized by an adaption that runs in shift operation based on differences in the segment times regarding its torque input in a fuel neutral manner with respect to the entire motor, whereby particularly a different cylinder filling has no influence on the synchronization. The cylinder synchronization is not active in the lambda-regulated homogeneous operation or homogeneous lean operation at the gasoline direct injection, merely the adaption values from the shift operation are taken over. At an active single cylinder lambda regulation the regulation to a default lambda set value takes place fuel-sided without regard to the torque efficiency. An increased uneven running can result therefore in the homogeneous operation or homogeneous lean operation.

Combustion engines with direct gasoline injection into the combustion chamber and an engine control for illustrating several operating types and several injection sequences per working cycle—for example double injection—get more important. In particular jet-guided combustion processes require a higher metering accuracy of the high pressure injection valves, in order to be able to optimally use all advantages, as for example multi-injections with extremely small single injections. Such a procedure is very advantageous for the starting and warming up of the combustion engine and for the heating of the catalyzer. The necessary metering accuracy is especially in the range of the smallest amounts only able to be illustrated by special procedures.

Combustion engines, which enable a shifted engine operation, often use as so called cylinder synchronization function, which synchronizes the torque parts of the individual cylinders to an entire torque based on the determined uneven running terms. Because the torque is proportional to the injected fuel mass in a shifted operation, the metering tolerances of the injection valves are balanced by this procedure to a high degree.

In the homogeneous operation a single cylinder lambda regulation is preferably used for synchronizing the cylinder individual air/fuel relation. But this procedure is strictly limited. In particular the use of a single cylinder lambda regulation is only possible restrictedly at high cylinder rates and at the use of a turbo charger. Also an asymmetric firing order, for example typical at 8 cylinder engines, provides a big problem for this procedure.

DE 198 28 279 A1 already shows a procedure for synchronizing cylinder individual torque inputs of a multi-cylinder combustion engine, at which an uneven running signal is used for the cylinder synchronization, which is expressed for example in different segment times of the crank- or cam shaft. Based on the uneven running signal the torque inputs of the individual cylinders are synchronized by regulating the injection amount.

The cylinder synchronization function is only active in shift operation. However in homogeneous operation or homogeneous lean operation a factor is used for the injection time correction that has been determined from pre-control engine maps in the shift operation, by the cylinder synchronization is switched to passive.

DE 38 00 176 A1 shows a procedure for a cylinder individual lambda regulation, so that the lambda values for all cylinders that have been measured in the exhaust gas are basically the same. For this purpose a corresponding control time is determined for each injection direction. A similar cylinder individual lambda regulation is also described in DE 199 03 721 C1 as well as in DE 199 09 474 A1.

A tendency for the engine is the use of the gasoline direct injection in combination with turbo charging. Due to elaborate exhaust gas after-treatment the shifted operation is waived and it is only driven in homogeneous operation. The consequence is that none of the actually available procedures can be used for quantity error compensation.

SUMMARY

It is provided according to the invention that the cylinder are synchronized with regard to their torque input in order to achieve a running smoothness as god as possible, whereby an uneven running signal is evaluated for this purpose, whereby fuel is injected in at least one injection into a combustion chamber of a cylinder, and whereby the at least one injection contributes to the torque of the combustion engine.

It is very advantageous that fuel is injected into the combustion chamber of the cylinder in a torque-neutral manner regarding the evaluation and the evaluation algorithm of the cylinder synchronization with an after-injection during a work cycle of the cylinder, and the after-injection is so assessed, that the exhaust gas basically corresponds a stoichiometric air-fuel mixture.

Such an approach has furthermore the advantage that the cylinder synchronization can also take place in a homogeneous operation of the combustion engine and is not only limited to a shift operation of the combustion engine. In particular the approach has the advantage that a downstream exhaust gas treatment can also work in an optimal operating point during a cylinder synchronization and that the working quality does not diminish.

It is furthermore known that the combination of rich and lean operated cylinders in a not synchronized status cause strong thermal exposure of the catalyzer, due to exothermal reactions in the exhaust gas pipe. Such conditions are also advantageously avoided for the homogeneous operation of the combustion engine by the cylinder synchronization according to the invention.

The synchronization according to the invention furthermore improves especially exhaust gas and running smoothness of the operating types with multi-injection.

Advantageous improvements and configurations of the procedure stated in the independent claim are possible by the measures stated in the sub-claims.

It is provided in a further advantageous embodiment to divide the torque-determining injection and/or also the after-injection in several injections. By dividing them into several injections it is advantageously enabled to optimally adjust the air-fuel mixture distribution in the combustion chamber and to allow a fuel-saving operation of the combustion engine.

A further advantage is also to deposit the torque-determining injections in the induction stroke and/or in the compression stroke in order to realize consumption favorable mixture distributions for example.

A particular advantage is to undertake the cylinder synchronization according to the invention in homogeneous operation of the combustion engine, whereby an elaborate change of the operating type for the cylinder synchronization is avoided.

It is furthermore advantageously provided that the after-injection (30) takes place in such a way that a basically complete combustion of the fuel that has been injected in the after-injection (30) is enabled.

A further advantage is to deposit the after-injection (30) later than 30° KW and preferably before 180° after the upper dead center of the compression stroke (ZOT).

It is very advantageous if the after-injection is assessed in such a way that a fuel amount that has been injected at the after-injected into the at least one combustion chamber of the combustion engine is chosen higher than a default threshold value. Thereby disruptive influences of tolerances can be avoided for example.

It is especially advantageous if the default threshold value is chosen depending on a parameter, which characterizes an injections valve, in particular a magnet valve, which is used for injecting fuel into the combustion chamber of the combustion engine. In doing so the after-injection is adjusted for example to construction-related and/or tolerance-related characteristics of the injection valve, and the effectiveness of the procedure according to the invention is increased. Additionally the procedure is thereby also available to inexpensive magnet valves.

It is very advantageous if the default threshold value is chosen depending on a smallest realizable injection amount of the used injection valve, in particular a magnet valve, which has been used for injecting fuel into the combustion chamber of the combustion engine. Thereby it is ensured that the injection valve is controlled in its reliable operation range.

It is also very advantageous if the exhaust gas is conducted into a catalyzer that is arranged in the combustion engine, and if the default threshold value is determined depending on at least one operating parameter of the catalyzer. Thereby an exhaust gas impairment with regard to nitrogen oxide (NOx) by an incomplete conversion of the exhaust gas in the catalyzer is avoided.

It is very advantageous if a catalyzer status is chosen as operating parameter of the catalyzer, for example the oxygen storage capability (OSC) and/or a catalyzer temperature. In doing so the procedure is implemented especially simple with operating parameters of the catalyzer that are already contained in control units for motor vehicles.

It is very advantageous if the after-injection into the combustion chamber of at least one cylinder of the combustion engine is suppressed into at least one work cycle of the at least one cylinder of the combustion engine. Thereby a stoichiometric air-fuel mixture is used, averaged over several work cycles of the cylinder of the combustion engine, even if each single after-injection is higher than an after-injection that is theoretically required for achieving the stoichiometric air-fuel mixture. That is especially important if the theoretical after-injection is smaller than the smallest realizable injection amount of the injection valve.

It is very advantageous if the after-injection takes place in less than all combustion chambers of the combustion engine. Thereby a stoichiometric air-fuel mixture is used, averaged over all cylinders of the combustion engine, even if each single after-injection is higher than the after-injection that is theoretically required for achieving the stoichiometric air-fuel mixture. That is especially important if the theoretical after-injection is smaller than the smallest realizable injection amount of the injection valve.

It is very advantageous if the procedure is implemented in the presence of several cylinder banks for each of these cylinder banks. Thereby a stoichiometric air-fuel mixture is used, averaged over all cylinder whose combustion chamber is arranged at the same exhaust gas pipe, even if each single after-injection is higher than the after-injection that is theoretically required for achieving the stoichiometric air-fuel mixture. That is especially important if the theoretical after-injection is smaller than the smallest realizable injection amount of the injection valve.

BRIEF DESCRIPTION OF THE DRAWINGS

Further features, application possibilities and advantages of the invention arise from the following description of the embodiments of the invention, which are illustrated in the drawings.

DETAILED DESCRIPTION

The invention is basically emphasizes to enable a quantity error compensation of the injected fuel mass also for the application at gasoline direct injection with turbo charging and homogeneous operation as well as engines with higher cylinder rates and/or also with asymmetric ignition order.

Figure 1:
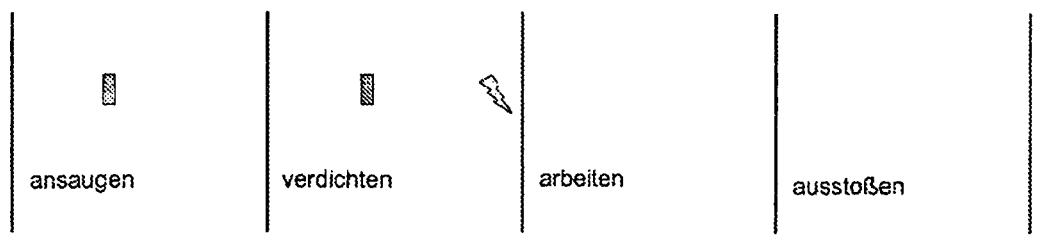
FIG. 1 schematically shows the injection and ignition of a combustion engine in normal operation.
Figure 2:
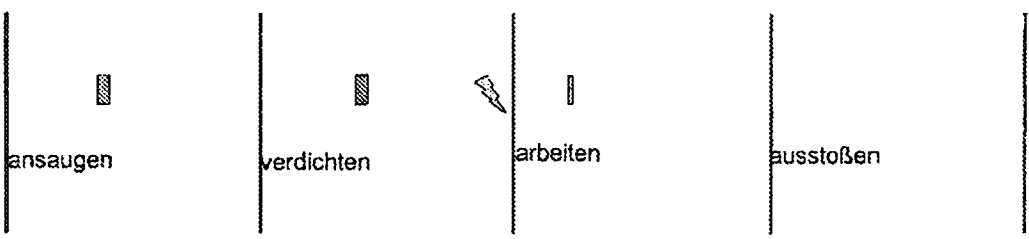
FIG. 2 schematically shows a first embodiment of a cylinder synchronization with an after-injection according to the invention.

The intervals of a work cycle of a four-stroke combustion engine are illustrated in FIGS. 1 and 2, with an intake stroke 1, a compression stroke 2, a work stroke 3 and an output stroke 4. A first injection sequence 10 takes place in the input stroke 1 (sequence for example at least 1 up to 3 injections) and a second injection sequence 20 in the compression stroke 2 (sequence for example at least 1 up to 3 injections) with a subsequent ignition 50 of the creating fuel-air mixture in the range of the upper dead center of the compression stroke 2. The adjusting torque depends hereby basically on the fuel amount that has been injected by the two injection sequences 10, 20. The first two injection sequences 10, 20 serve basically for providing a homogeneous lean air-fuel mixture, which is preferably required for the cylinder synchronization.

Figure 3:
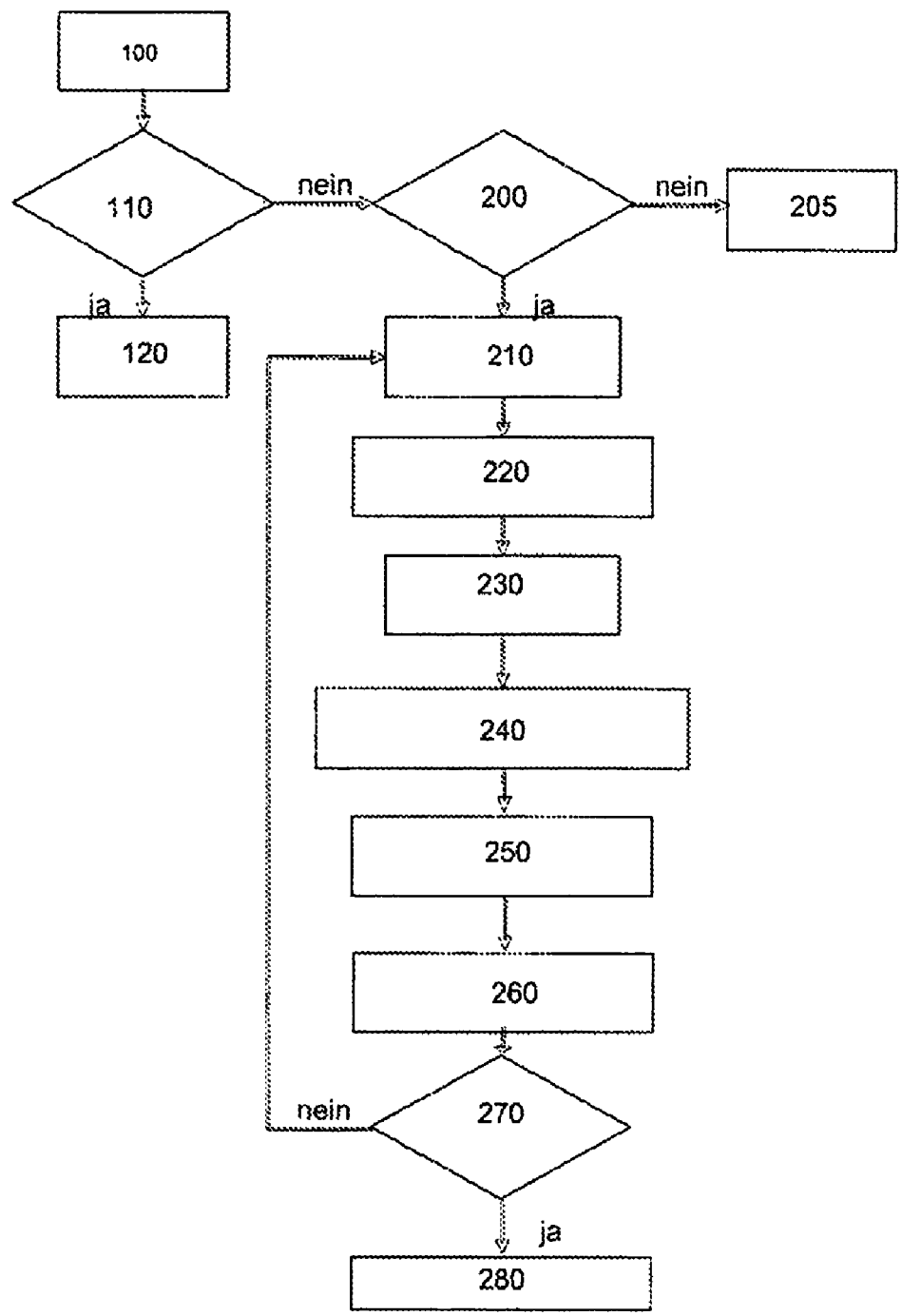
FIG. 3 shows a sequential order of a cylinder synchronization according to the invention.

FIG. 3 shows a sequential order of a first embodiment of a typical cylinder synchronization. The adaption is started in a first step 100, whereby it is checked in a step 110, whether an adaption already takes place. If yes the further processing is terminated in a step 120. If no adaption is started, it is checked in a step 200, whether operating parameters of the combustion engine are in an applicable adaption range. If the operating parameters are outside of such a range the adaption is terminated in a step 205.

An applicable adaption range can for example be available in an average torque range at a low load. Ranges with a high torque and high load requirements are preferably exempted. These ranges can be adjusted combustion engine specifically without further ado.

Otherwise a multi injection of the combustion engine is initiated in a step 210, whereby the first injection sequence 10 and the second injection sequence 20 are calculated in such a way that the combustion engine runs in a homogeneous lean operation. Summed up the entire fuel mass of the first two injection sequences 10, 20 has to satisfy the demand according to a reliable combustion chamber lambda (1<lambda in the combustion chamber <x). This means that the amount of the last after-injection 30 has to be calculated in such a way that a combustible and simultaneously sufficient lean combustion chamber lambda (1<lambda in the combustion chamber <x) remains.

Thereby the algorithm of the cylinder synchronization can be used by the running smoothness signal for the quantity error compensation on the one hand, and on the other hand a secure inflammation is ensured. A second injection sequence 20 can be activated in step 230 and fuel can be injected in the compression stroke 2 of the combustion engine with correspondingly calculated angle positions. A running smoothness signal is evaluated in step 230. In step 240 applicable injection parameter or correction values are determined, which can improve the running smoothness of the combustion engine.

The correction values are saved in step 250 and as included in the calculation as adaption values in step 260, whereby a new and/or second injection sequence 10, 20 takes place with the calculated adaption values.

If no sufficient running smoothness is determined in a subsequent step 270, the adaption is restarted in a step 210. The adaption is terminated in a step 280 if the running smoothness is assessed as sufficient.

FIG. 1 shows an injection order, which enables a cylinder synchronization during a lean operation of a combustion engine. While in a homogeneous operation of the combustion engine the produced torque is basically influenced by the added air mass, thus air controlled, the injected fuel mass is the torque determining element (fuel conducted) in lean operation. Therefore it is typically switched from a homogeneous operation of the combustion engine to a lean operation and/or shift operation for the cylinder synchronization.

But since usual exhaust gas after treatments require a fuel-air relation in the range of lambda=1, a cylinder synchronization does not come into consideration in these motor vehicle.

Furthermore a lean mixture (typically lambda=1.1 to 1.2) would result in exhaust gas impairment with regard to NOx, because three-way catalyzers require a stoichiometric mixture for a complete conversion.

Therefore it is provided according to the invention, as it is shown in FIG. 2, to deposit an after-injection in the work stroke 3 of the combustion engine, which is assessed in such a way that the entirely injected fuel—thus the sum of all injections in the present stroke order intake-, compression- and work stroke—creates an air-fuel mixture around lambda=1. The deposit of a further fuel amount by the after-injection 30 in a suitable crankshaft angle area in the work stroke 3 does practically not contribute anymore to the torque of the combustion engine, and can be neglected for the running smoothness of the combustion engine or also for the evaluation of the running smoothness by the uneven running signal.

The invention therefore emphasizes basically to deposit an after-injection after the ignition 50, with the aim to generate a stoichiometric entire mixture in sum, which means an exhaust gas neutral sum lambda value (lambda=1).

The position of the injection has to take place preferably in an angle range, in which no considerable torque input takes place, which would be relevant for the cylinder synchronization. Preferably it is a range later than 30° KW after ignition-OT. This means the running smoothness signal based cylinder synchronization functionality is basically based on the torque input of the lean main injection divided in a first and if necessary a second injection sequence 10, 20 and an after-injection 30.

Criteria for the determination of the angle range of the after-injection are preferably the following:
1. Demand for a complete combustion (exhaust gas, running smoothness) as the latest possible injection-angle-angle
2. Demand for a cross influence freedom regarding the algorithm of the cylinder synchronization as the earliest possible angle.

The cross influence freedom means here basically the influence of the after-injection on to the evaluation of the uneven running. If the after-injection takes place too early, even the after-injection produces a considerable torque input, which can be noticed in the evaluation of the uneven running signal. The after-injection should therefore take place in such a way that a possibly present torque input of the after-injection has to be neglected for the evaluation/algorithm of the cylinder synchronization.

However the after-injection cannot take place too late so that a complete combustion of the after-injected fuel is possible.

These criteria are preferably achieved for an after-injection in a crankshaft angle range of 30° to 180° after the ignition-OT. Thereby also other ranges come into question depending on the arrangement of the combustion engine as long as the above mentioned criteria are fulfilled.

In normal operation, which means stoichiometric engine operation, typically the injection in the suction stroke (suction-synchronic) takes place. Optionally a suction-synchronic multi injection is also often used, in order to work against the soot creation and the oil thinning. Furthermore an injection in the compression stroke 2 is also possible in normal operation.

But in order to be able to use the described adaption procedure, now an additional after-injection is deposited in the work stroke 3 (after ignition-OT). The aim of this injection is to bring the lean main mixture (typically lambda=1.1 to 1.2) up to a stoichiometric value (lambda=1). The calculation of the division relations of the individual injections has to take place corresponding to this demand. Altogether the applicative parameters of the individual injections, as for example the injection angle, division relations, ignition angle, etc., have to be considered in the engine control software correspondingly to the combustion process requirements like the ignition willingness, running smoothness, emissions, catalyzer temperatures.

The application of the procedure according to the invention takes place analogously for combustion engines with more than one cylinder, whereby the combustion chambers, cylinders and injection valves for the injection of fuel are arranged in the combustion engine familiar to the specialist. In that case a first cylinder is selected for the after-injection 30 in step 210. Optionally between step 240 and step 250 the selection of one or several additional cylinders for the after-injection 30 takes place in an additional step that is not shown in FIG. 3. Thereby the mixing of the exhaust gas is improved compared to the conversion of the after-injection 30 only in the first cylinder.

In a second embodiment the procedure according to the invention is extended for the use of injection valves, which can only inject a default fuel amount reliably and reproducibly, if the default fuel amount is higher than a threshold value S. for example magnet vales are often used due to the price advantage compared to other valves. A characteristic of magnet valves is however that at the same default fuel amount not always not always the same fuel amount is injected reliably and reproducibly at each control of the magnet valve. This characteristic of magnet valves is construction related and/or caused by manufacturing tolerances.

Figure 4:
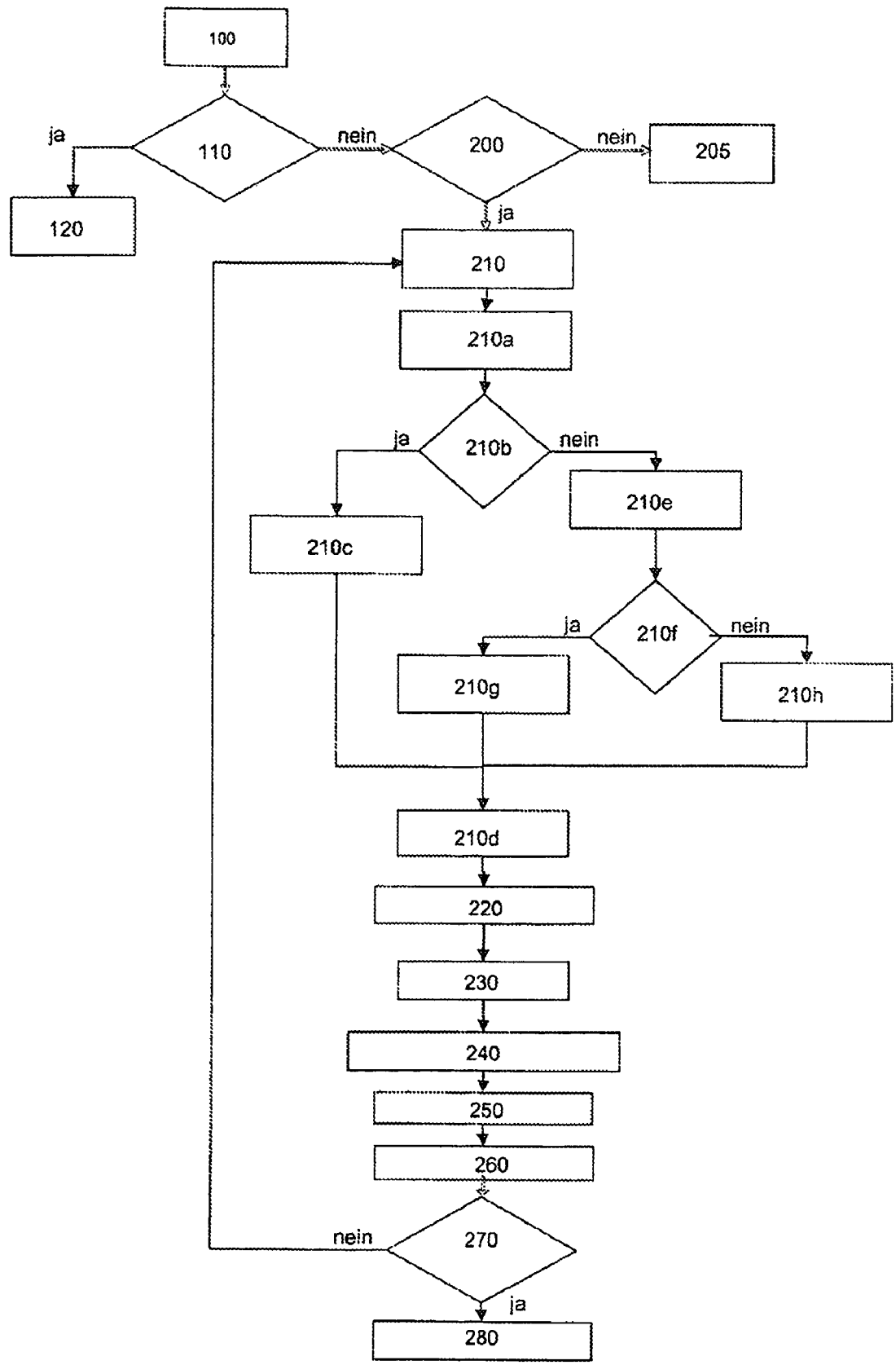
FIG. 4 shows a sequential order of a second embodiment of the cylinder synchronization according to the invention.

FIG. 4 shows a sequential order of the second embodiment, which basically corresponds with the sequential order of the first embodiment from FIG. 3.

Step 100 of the second embodiment corresponds with step 100 of the first embodiment. Additionally a second nominal fuel amount SK2 is initialized in the value zero in the second embodiment in step 100.

The steps 110, 120, 200, 205, 210, 220, 230, 240, 250, 260, 270 and 280 of the second embodiment do not distinguish themselves from the steps in the first embodiment and have therefore in FIG. 4 the same reference signs as in FIG. 3.

Like in the first embodiment the amount of the after-injection 30 is detected in step 210. Subsequently a step 210*a* follows step 210 according FIG. 4.

In step 210*a* a threshold value S is selected depending on a parameter, which characterizes an injection valve, especially a magnet valve, which is used for the injection of fuel into the combustion chamber of the combustion engine. For example the default threshold value S is selected to be equal to the smallest realizable injection amount of the fuel that is used for the injection into the combustion chamber of the combustion engine. The smallest realizable injection amount is for example 3 mg.

Subsequently in a step 210*b* it is checked, whether the amount of the after-injection 30, which is known from the first embodiment and which is labeled also as after-injection amount in the following, is higher than the threshold value S. if that is the case it is branched to program point 210*c*; otherwise to program point 210*e*.

In step 210*c* a first nominal fuel amount SK1 is determined depending on the after-injection amount. The first nominal fuel amount SK1 is for example selected to be equal to the after-injection amount. Subsequently it is branched to a step 210*d*.

In step 210*d* the after-injection 30 is converted according to the first nominal fuel amount SK1 and the procedure according to the invention is subsequently continued in step 220.

In step 210*e* the second nominal fuel amount SK2 is changed depending on the after-injection amount. The second nominal fuel amount SK2 is for example increased by the amount of the after-injection 30.

In a step 210*f*, which follows step 210*e*, it is checked, whether the second nominal fuel amount SK2 is higher than the threshold value S. This results automatically in a default amount of work strokes without after-injection 30. If so it is branched into step 210*g*, if not to step 210*h*.

In step 210*g* the first nominal fuel amount SK1 is determined depending on the second nominal fuel amount SK2. The first nominal fuel amount SK1 is for example selected to be equal to the second nominal fuel amount SK2. The second nominal fuel amount SK2 is afterwards set to the value zero. Subsequently the procedure according to the invention is continued in step 210*d*.

In step 210*h* the first nominal fuel amount SK1 is set to zero, which means no injection takes place. Subsequently the procedure according to the invention is continued in step 210*d*.

Figure 5:
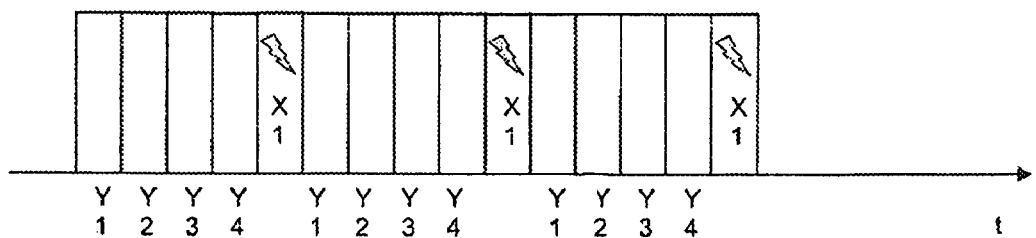
FIG. 5 schematically shows a second embodiment of a cylinder synchronization with an after-injection according to the invention.

FIG. 5 shows a possible time distribution of the work cycles for example for the threshold value S=4 mg and the first nominal fuel amount SK1=0.275 mg. As it is shown in FIG. 5 the after-injection 30 is carried out for 1 work play X1. The work play X1 with after-injection 30 is shown as rectangle with a small flash. The work plays without after-injection are shown as rectangles without a flash and labeled for four work cycles with Y1 to Y4. FIG. 5 shows also a periodic repeat of the work plays Y1 to Y4. The repeat is generally not period for changing threshold values S.

The procedure according to the invention can be used individually for each cylinder at a combustion engine with more than one cylinder. In the case of the second embodiment a first nominal fuel amount SK1 and a second nominal fuel amount SK2 is determined for each cylinder.

Alternatively or additionally the second nominal fuel amount SK2 can be determined as a sum of the after-injection amount of all cylinders in a fourth embodiment. Thereby the after-injection 30 is realized in the cylinder, which is located at this point of time in the work stroke, at which the second nominal fuel amount SK2 that is determined for the after-injection 30 exceeds the threshold value S. in a combustion engine with four cylinders for example, the threshold value S=1 mg and a nominal fuel amount SK1=0.275 mg it is not injected into three cylinders of the combustion engine. The threshold value S=1 mg is not exceeded and it is not injected into the fourth cylinder until the work stroke of the fourth cylinder.

In addition to that the procedure according to the invention can be carried out for each cylinder bank in the presence of several cylinder banks. Therefore the cylinders of the same cylinder bank are considered together and the procedure according to the invention correspondingly applied.

Figure 6:
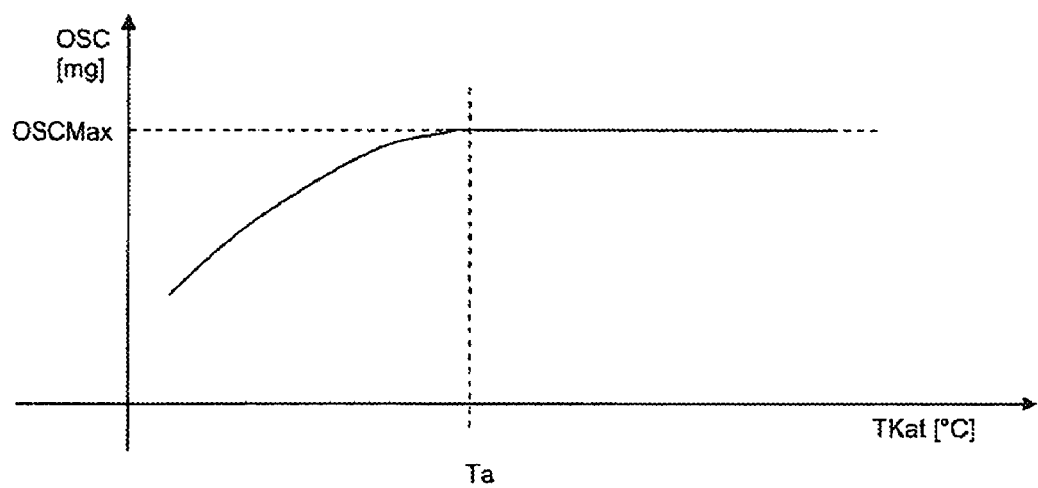
FIG. 6 shows a relation between a catalyzer temperature and an oxygen storage capability (OSC).

If the combustion engine comprises a catalyzer the after-injection 30 is determined in a modification of all embodiments depending on at least one operating parameter of the catalyzer. For example a catalyzer status like an oxygen storage capability (OSC) and/or a catalyzer temperature TKat are chosen as operating parameters of the catalyzer. The catalyzer temperature TKat for example is used as a measure for the oxygen storage capability (OSC). The oxygen storage capability (OSC) increases thereby as it can be seen in FIG. 6 with an advancing catalyzer temperature TKat in order to approach with a dropping gradient a maximum value OSCMax of for example 400 mg. A range of a lower oxygen storage capability (OSC) that is critical for the operation of the catalyzer is for example available below a start up temperature Ta, from which the catalyzer develops its effectiveness. The startup temperature Ta is for example 450° C. At this start up temperature Ta the oxygen storage capability (OSC) has definitely reached the maximum value of for example 400 mg. the after-injection 30 is thereby always suppressed depending on the catalyzer temperature TKat, if the catalyzer temperature TKat is below the start up temperature Ta, for example lower than 450° C. The startup temperature Ta is for example determined individually on a test station in an application phase for the catalyzer in such a way, that it shows for example the minimally determined catalyzer temperature Ta, at which the maximum oxygen storage capability (OSC) has been achieved for the first time.

The invention claimed is:

1. A method of optimizing a running smoothness of an internal combustion engine by equalizing a torque contribution of a plurality of cylinders of the internal combustion engine, the method comprising:
　　upon evaluation of an uneven running signal, ascertaining a correction value for a fuel quantity to inject in each of the plurality of cylinders during a lean operation of the internal combustion engine in order to equalize the cylinders;
　　injecting a fuel quantity into a combustion chamber of a respective cylinder in at least one injection based on the ascertained correction value, wherein the at least one injection contributes to a torque of the internal combustion engine;

upon evaluation of a running smoothness signal, injecting an after-injection of fuel into the combustion chamber of the respective cylinder during a power stroke, wherein the after- injection of fuel is injected in a torque-neutral manner, wherein a fuel amount of the after-injection is assessed such that an exhaust gas has a stoichiometric air/fuel mixture.

2. The method of claim 1, further comprising dividing at least one of: the at least one injection; and the after-injection into a plurality of injections.

3. The method of claim 1, further comprising injecting the at least one injection during at least one of: an induction stroke; and a compression stroke of the combustion engine.

4. The method of claim 1, further comprising optimizing the running smoothness of the internal combustion engine at a homogeneous operation of the internal combustion engine.

5. The method of claim 1, further comprising performing the injection of the after-injection of fuel such that the injected fuel is completely combusted.

6. The method of claim 1, further comprising injecting the after-injection of fuel later than a crank shaft angle of 30° after an upper dead center of a compression stroke.

7. The method of claim 1, further comprising injecting the after-injection of fuel prior to a crank shaft angle of 180° after an upper dead center of the compression stroke.

8. The method of claim 1, further comprising selecting the fuel amount of the after-injection to be higher than a default threshold value.

9. The method according of claim 8, further comprising selecting the default threshold value based on a parameter that characterizes an injection valve that has been used for injecting the fuel.

10. The method of claim 8, further comprising selecting the default threshold value based on a minimum realizable injection amount of an injection valve that is used for injecting the fuel.

11. The method of claim 1, further comprising directing an exhaust gas into a catalyzer that is arranged in the internal combustion engine, wherein the fuel amount of the after-injection is determined depending on at least one operating parameter of the catalyzer.

12. The method of claim 11, further comprising selecting a catalyzer status as the at least one operating parameter of the catalyzer, the catalyzer status comprising: an oxygen storage capability; and a catalyzer temperature.

13. The method of claims 2, further comprising repressing a subsequent after-injection into a combustion chamber of at least one of the plurality of cylinders in at least one power stroke after a default number of after-injections.

14. The method of claim 2, further comprising injecting the after-injection in less than all of the plurality of combustion chambers.

15. The method of claim 1, further comprising performing a cylinder synchronization in the presence of a plurality of cylinder banks for at least one cylinder bank.

* * * * *